Jan. 25, 1949.  W. E. PALMER  2,459,957
WELDING STUD
Filed May 3, 1945
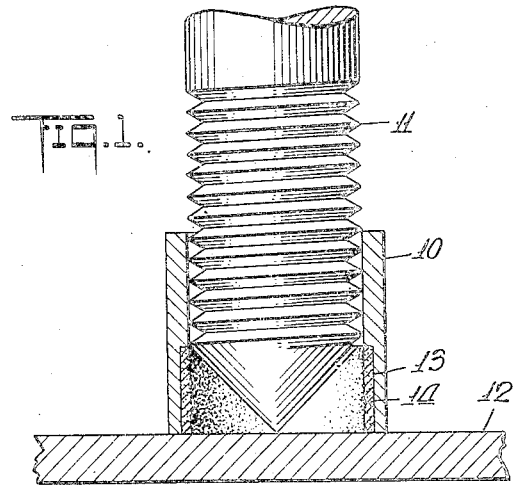
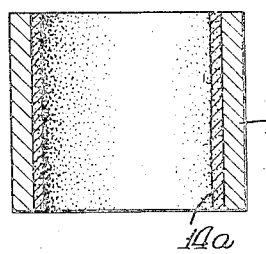
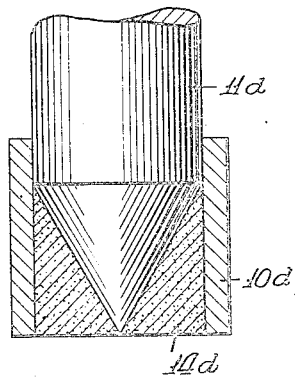
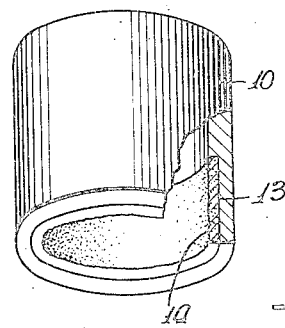
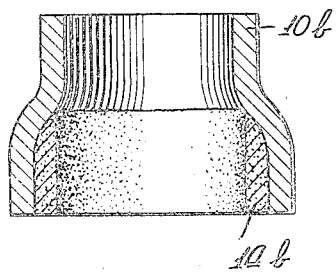
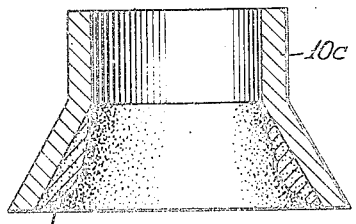
INVENTOR
Walter E. Palmer
BY
ATTORNEYS Patented Jan. 25, 1949

2,459,957

UNITED STATES PATENT OFFICE 2,459,957

WELDING STUD

Walter E. Palmer, Fair Lawn, N. J., assignor, by mesne assignments, to National Cylinder Gas Company, Chicago, Ill., a corporation of Delaware Application May 3, 1945, Serial No. 591,711

5 Claims. (Cl. 287—20.2)

This invention relates to the art of butt welding metal studs, bolts or analogous elements to a metal plate or other analogous structural part by the forming of an electric arc therebetween, which acts to melt the juxtaposed parts. The current is then shut off and the end of the stud forced into the molten pool or puddle, and permitted to cool and become permanently attached in place.

In such electric welding operations it is common practice to employ a fluxing or scavenging material which acts to remove impurities from the weld area, or protect the molten metal from oxidizing during the forming of the weld.

In Crecca Reissue Patent Re. 22,108 it has been proposed to use a ferrule of fire resisting material which loosely encircles the stud and rests on the plate to form a receptacle into which an arc initiating material may be placed. The stud is usually pointed and held slightly out of contact with the plate during the forming of the arc through said arc initiating material.

It has been proposed in Nelson Re. 22,411 and in Nelson 2,355,099 to confine fluxing material initially in a chamber on the end of the stud and enclosed by a plate or metal wall. The flux is in loose particle form and may fall directly into the middle of the puddle and often causes porosity or becomes incorporated in the weld or causes non-uniform action due to lack of proper distribution. In my Patent 2,413,370, granted December 31, 1946, on copending application, Serial No. 537,033, I have disclosed and claimed a stud having flux material carried thereby adjacent to but spaced from the pointed end. In such constructions the stud with its fluxing material may be made and sold as an article of manufacture, but it involves a substantial increase in the cost of the stud due to the required machining of the stud and the application and securing of the flux thereto.

There is also disclosed in my said application a ferrule for retaining fluxing material adjacent to the end of the stud. The present application is a continuation in part of said application No. 537,033.

One object of the present invention is to provide means for holding or supporting the fluxing, scavenging or oxidizing material adjacent to but encircling the point where the arc is formed so that it does not in any way interfere with the free flow of the current which causes the localized melting of the stud and the plate. Said means acts to hold or support said material sufficiently close to the arc and/or melting material so that after the formation of the arc, the flux may become heated and flow over and around the molten metal.

A further object is to provide a support for the fluxing and scavenging material and which holds said material in the form of an annulus around the point of fusion of the metal, so it may flow radially inwardly and uniformly over the puddle and thus properly protect the molten metal from oxidizing, and properly scavenging the molten metal.

A further object is to provide a holder for the flux or scavenging agent, which holder does not require machining and is separate and independent of the stud, so that it may be used with any ordinary or standard form of stud, the cost for the stud and fluxing support being thus very substantially reduced below that of a machined stud carrying the fluxing material.

In carrying out my invention, I provide a ferrule, sleeve, or collar of fire resisting material, with an annulus of the fluxing or scavenging material carried on the inner surface thereof. The other end of the ferrule may be of such internal diameter that it may slip onto the end of the stud and with a light friction fit, or may be of such size that when the ferrule is placed on a plate and the stud projected therethrough the ferrule will be substantially centered in respect to the stud.

As the annulus of fluxing or oxidizing material encircles the stud, it will melt, vaporize, or otherwise become detached from its support and flow inwardly over the molten metal, after there has been produced sufficient heat to start the melting. The material is confined by the wall of the ferrule so that it cannot flow away from the molten metal, even though the plate to which the stud is being welded is in an inclined position, or even if the stud be welded to the underside of the plate. The correct amount of the material may be preselected and may be varied for different sizes of studs or studs of different kinds or of different alloys. As the material is not on either the plate or the stud, but is on a separate annular holder it will act to protect the heated portions of both the plate and the stud. The ferrule serves a double function if the stud is to be attached to the plate through a hole in wooden sheathing, as it not only carries the fluxing, scavenging or oxidizing material but protects the wood from being overheated or burned during the welding of the stud.

In the accompanying drawing I have illustrated various forms of flux supports. In the drawings Fig. 1 is a section through a plate with a threaded pointed stud and one form of flux carrying ferrule.

Fig. 2 is a perspective view of the ferrule, a part being broken away and

Figs. 3, 4 and 5 are sections through other forms of ferrules and

Fig. 6 is a section through a ferrule attached to a stud as disclosed in my application above referred to.

The ferrule 10 as shown in Fig. 1 is of cylindrical form and of such size as to have a light friction fit on a threaded stud 11 with a pointed end for contacting with a metal plate 12. The wall thickness of the ferrule is reduced at one end to form an annular recess 13 to receive and retain an annular body of material which may act as a flux, scavenging or oxidizing agent. As shown, the length of this annulus is approximately that of the pointed end of the stud.

In Fig. 3 I have shown a ferrule 10a which has an annulus or layer 14a of the flux and extending the full length of the ferrule.

In Fig. 4 I have shown a ferrule 10b which has one end portion cylindrical to fairly closely fit the stud and the other end portion somewhat bell-shaped to receive and support a thicker annular layer 14b of the flux.

In Fig. 5 the ferrule 10c has a frusto-conical lower section to the inner surface of which there is applied a frusto-conical annulus 14c of the flux.

In Fig. 6 there is shown a ferrule 10d and stud 11d similar to what is shown in Fig. 1 but the annulus 14d substantially fills the space between the lower end of the ferrule and the pointed end of the stud. The stud, ferrule and flux may be assembled at the factory and sold as a single article of manufacture, the flux serving as a binder to hold the stud and ferrule together.

I do not wish to be limited to any particular composition for the flux, scavenger or the like, as it may be of any composition commonly used in connection with welding operations. It is preferable that it have some suitable binder incorporated therein so that the material will hold in place in the ferrule during shipment and application to the plate or stud to be welded.

The ferrule itself may be of any suitable fire resistant material and is preferably of such composition that it is fragile and evenly broken away after it has served its purpose of initially supporting the flux and confining it during the welding. It may initially be very strong but become fragile by the action of the welding heat.

If the ferrule is made to have a friction fit on the stud it may be pushed onto the stud so as to extend a short distance beyond the end of the stud so that in placing it in position on a plate it will engage the plate before the stud does and this insures proper contact with the plate. The fit should not be so tight as to seriously interfere with the pushing of the stud into the pool of molten metal after the latter has been formed.

As previously noted it may fit very loosely so that it may be placed in position on the plate and before welder and the stud carried thereby are brought into position with the stud extending into the ferrule. Arc initiating material may be placed in the ferrule as disclosed in the Crecca patent above identified or may be omitted depending on the type of welding apparatus employed.

I have shown the stud as being pointed, but as the stud per se forms no part of my invention the stud may be of any conventional form.

As above indicated, the material carried by the ferrule may serve as a flux, a scavenging agent, an oxidizing agent or for other analogous purpose in protecting and purifying the molten metal. I use the term fluxing material in the claims as a generic name for such compositions.

The ferrule is illustrated as circular in cross-section. This is not essential as it may be any desired shape, and the stud itself may be square, hexagonal or of any other cross-sectional form.

Having thus described my invention, what I claim as new and desire to secure by Letters Patent:

1. An article of manufacture for use in the welding of a stud to a plate, said article comprising an annular ferrule of fire resistant material adapted to receive the stud, and an annulus of form retaining fluxing composition adhering to and carried by the inner surface of said ferrule.

2. An article of manufacture comprising a ferrule of fire resistant material having an annular layer of form retaining fluxing material, carried thereby on the inner surface thereof and extending along only a portion of the length thereof.

3. An article as defined in claim 1 in which the annulus is adjacent to one end of said ferrule.

4. In combination a welding stud, a ferrule of fire resistant material and having a loose friction fit on said stud and an annular body of fluxing material carried by said ferrule adjacent to one end of said stud, the inner diameter of said body being at least as great as the outside diameter of said stud.

5. In combination a welding stud having a portion of reduced diameter at one end, a ferrule loosely fitting on said stud above said reduced end and an annular body of form retaining fluxing material, carried by said ferrule in the annular space between said ferrule and said reduced end.

WALTER E. PALMER.

REFERENCES CITED

The following references are of record in the file of this patent:

UNITED STATES PATENTS

| Number | Name | Date |
|---|---|---|
| Re. 22,108 | Crecca | June 9, 1942 |
| Re. 22,411 | Nelson | Dec. 21, 1943 |
| 2,315,502 | Crecca et al. | Apr. 6, 1943 |